Aug. 16, 1960            G. S. BUCCINO            2,949,181

SUTURE PACKAGE AND PROCESS OF MAKING SAME

Filed Nov. 13, 1958

FOLDED EDGE

INVENTOR.
GAETANO SALVATORE BUCCINO.

BY Samuel Branch Walker

ATTORNEY.

2,949,181
SUTURE PACKAGE AND PROCESS OF MAKING SAME

Gaetano Salvatore Buccino, Danbury, Conn., assignor to American Cyanamid Company, New York, N.Y., a corporation of Maine Filed Nov. 13, 1958, Ser. No. 773,606

12 Claims. (Cl. 206—63.3)

This invention relates to a liquid-tight, ethyleneoxide permeable, suture-containing package formed from a laminate of an external polyester film and an internal polyethylene or polyvinyl film, which package may have a strippable peaked seal with a stress concentrating tip, and a method of making such packages.

In the past surgical sutures have usually been sealed in a tubing fluid in glass tubes. Some have been dry packed in sealed glass tubes. Many patents and other literature references show attempts to form satisfactory packages from plastic materials which would cut down on the weight and size of the final package and eliminate the disadvantages of having breakable glass tubes and broken glass fragments therefrom in an operating room. Problems of economy, obtaining a film which was impermeable to contamination, and reasonably handleable, have introduced such problems that glass tubes have long remained the preferred form of packaging.

It has now been found that efficient and convenient packages are economically obtained by forming an envelope from a laminate of a polyester film and a polyethylene or polyvinyl film, inserting the suture to be packaged, adding a conditioning liquid if one is desired, and sealing the envelope. Preferably the envelope containing the suture is packaged in a second envelope of the same type of laminate which has a strippable seal. It is convenient to open the inner package with sterile scissors from which the suture is lifted out with fingers or forceps for use. The outer envelope is preferably strippable so that by handling the lips only and opening by stripping the outer envelope, the inner envelope is released and may be dropped without touching or contaminating it onto the sterile stand or elsewhere as desired for use.

It has also been found that such an envelope of an external polyester film and an inside polyethylene or polyvinyl film is permeable to sterilizing gases such as ethylene oxide which gives a convenient method of sterilizing the interior of the packages after the packages have been made.

Further the packages are impermeable to formaldehyde in lower alcohols such as isopropyl alcohol and ethyl alcohol so that either the single or the double envelope may be exteriorly sterilized by storing in a formaldehyde-containing jar liquid for periods of at least some several months without damage to the suture or without the suture absorbing sufficient formaldehyde to deleteriously affect the patient when the suture is used.

The external film of the laminate is of a polyester such as the polymeric ester of ethylene glycol and terephthalic acid which is described in some detail in a patent to Swallow et al., 2,497,376, February 14, 1950, "Process of Producing Films." Such films are well-known in the packaging trade and are conveniently obtainable under the trademark "Mylar." Other film forming polymers of polyhydric alcohols and polycarboxylic acids may be used. The other film of the laminate is polyethylene, either the conventional low density polyethylene or the newer more dense linear polyethylene, or a polyvinyl film such as polyvinyl chloride or polyvinyl alcohol. These films individually have been used in packaging and individually are well known. A laminate of a polyester film and a polyethylene film is sold under the trademark "Scotch-Pak" by Minnesota Mining and Manufacturing Company. One film which is convenient for use in the packaging of sutures has a polyester film thickness of 0.0011 to 0.0015 inch and a polyethylene film thickness of 0.003 to 0.0035 inch, this being the commercial variation.

Polyester films from about 0.001 to 0.003 and polyethylene or polyvinyl thicknesses of about 0.002 to 0.005 inch give good suture packages. Thicker films may be used but add weight and cost without commensurate advantages.

Either the inner or the outer envelope may be formed by bending a wider strip together as a U and sealing the sides and top. Conveniently, separate strips are used which are sealed together on all sides to form the envelopes. In manufacture it is convenient to form an open-ended envelope and insert the suture therein, then at a suitable time, after adding liquid if desired, seal the open-ended side. The sealing may be accomplished between flat opposed dies or it may be accomplished between rotating dies. With rotating dies it is convenient to insert the inner envelope as the outer envelope is being formed. Such methods of sealing are known to those skilled in the art.

With the present laminate the melting point of the polyethylene or polyvinyl film is sufficiently below that of the polyester film that sealing may be readily accomplished by applying sufficient heat through the polyester film to soften and cause the inner films to adhere. Both polyethylene and polyvinyl films have a melting range or softening range rather than a sharp melting point and accordingly are much easier to handle in heat sealing operations than films such as the polyesters which have a sharp melting point.

If a maximum strength seal is obtained between two of the laminates used in the present invention, the film itself is apt to rupture before the seal tears. Accordingly, however, it is preferred to use one comparatively cool die member which may be at room temperature or permitted to attain a somewhat higher temperature from heat transfer in operation, and one heated die which die transfers the sealing heat through the contacting polyester film and softens the adjacent layer of the polyethylene or polyvinyl film before the film farther away becomes softened. Under the sealing heat this softened plastic material is displaced and forms a flash bead adjacent to the seal. When approximately half of the combined polyethylene or polyvinyl film thickness is displaced during the sealing operation, a seal is obtained which is readily strippable. Somewhat more or less of the polyethylene or polyvinyl film may be displaced and still give an ethylene oxide permeable strippable seal. The operator of the sealing machine can strip samples to be sure that a proper seal is being formed. Further the seal is perfectly secure against leakage at pressures up to those which cause stripping.

The exact conditions for attaining such a displacement vary widely, both with the type of polyethylene or polyvinyl film being used and with operating conditions. It is usually most convenient to use a dwell time of about half a second on reciprocating dies with a pressure of about 2000 pounds per square inch of film contacting die surface, and adjust the temperature to give the desired amount of displacement. Wider jaws require more rigorous conditions. With a jaw width of about 0.075 inch the dwell time may vary from about a quarter of a second up to two seconds or more with a pressure of about 500 to 3000 pounds per square inch and a temperature of from 275° F. to 400° F. at the die face. The pressure is given on the sealing area only.

Certain aspects of the present invention are more clearly understood from the examples which follow and from the accompanying drawings in which.

EXAMPLE 1

Wet inner, dry outer double envelope package

Figure 3:
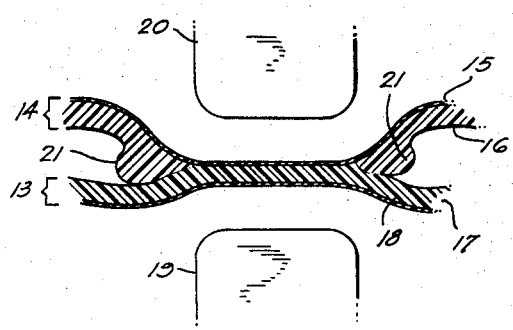
Figure 3 shows an enlarged cross-section on line 3—3 of Figure 2 illustrating the displacement of the inner polymer and the co-action of the sealing dies.

A catgut suture 11, which may have a needle attached, is folded in a label 12. Two sheets of laminate each consisting of a polymeric ethylene glycol terephthalate ester film about 0.0011 to 0.0015 inch thick and a low density polyethylene film 0.0035 to 0.0030 inch thick are brought into face to face relationship with the polyethylene films contacting. The front laminate 14 is then heat sealed to the rear laminate 13 in a U-shaped segment to form the envelope, and cut away from the remaining strip. All of the seals are of the same general type and whereas Figure 3 shows specifically the seal through the peaked roof, the same conditions are obtained elsewhere on the seal. As shown in this figure, the front laminate consisting of the front polyester film 15 and the front polyethylene film 16 are placed adjacent to the rear laminate consisting of the rear polyethylene film 17 and the rear polyester film 18. The rear laminate is supported by a cooler jaw 19. This jaw is somewhat above room temperature because of heat transfer to it during sealing operations but is allowed to attain its natural temperature without heating or cooling means. The heated jaw 20, which is heated by conventional means not indicated, is brought against the front laminate. The jaws are approximately 0.070 inch wide, the front jaw is at a temperature of 290° F. and is held in contact with the films at a pressure of 2000 pounds per square inch of film contacting area until the combined thickness of the polyethylene films is approximately the same as the original thickness of a single polyethylene film, a time of about one second being required. The displaced polyethylene appears as a bead 21 on each side of the seal.

Either an impulse-type of sealer in which heat is delivered to the heated jaw 20 during the sealing step only or a constantly heated jaw may be used. Both types are well-known in the industry.

After the inner envelope is formed as an open-ended envelope, the suture in the folded label is placed therein. The suture is then sterilized, conveniently by the use of ethylene-oxide gas, a conditioning fluid added, and the envelope sealed under sterile conditions. The inner envelope is then placed in an outer envelope consisting of a rear laminate 22 and a front laminate 23. The front and rear laminates are sealed together with a cathedral seal 24, so-called from the five-sided peaked roof configuration. At the top of the cathedral seal roof is a stress concentrating tip 25. This tip extends upward from the peak of the roof to give a slightly rounded point. In opening, the lips 26, which extend above the cathedral seal, are separated and the stress concentrating tip is the point at which the stresses concentrate and a tear is started, so that the two laminates may be torn apart without risk of rupturing the laminates themselves.

Figure 1:
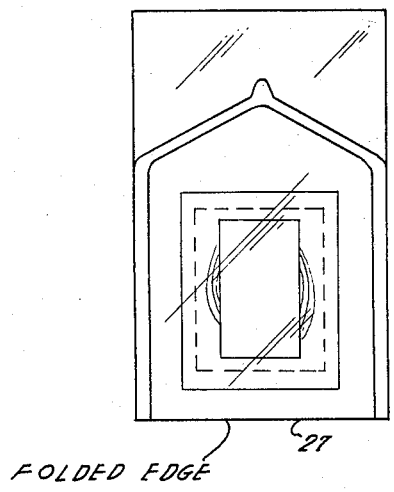
Figure 1 shows a double dry envelope, the outer envelope of which has a strippable seal and a folded edge.
Figure 2:
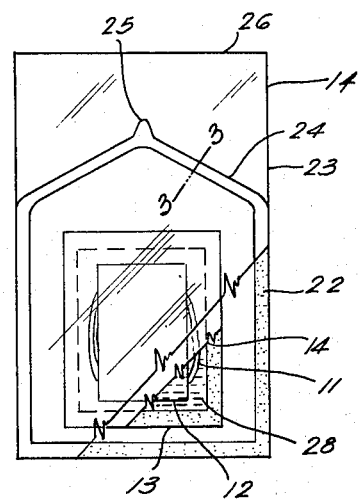
Figure 2 is a face view partially broken away showing a double envelope the inner envelope of which is liquid filled, both envelopes being heat sealed on all sides and the outer envelope being strippable.

Figure 2 shows the sealed areas over which the polyethylene is in part displaced, parts of the envelope being shown as broken away to show interior details.

The thus formed package may be sterilized by contacting with ethylene oxide or other sterilizing gas or it may be sterilized by radiation from a suitable source using X-rays, gamma rays, neutrons, or electrons.

EXAMPLE 2

Dry inner, dry outer suture package

The process of Example 1 is repeated except that a silk suture is used and the inner package sealed dry.

The outer package is formed from a single sheet of laminate folded together as a U, the inner package is placed within the U, and the open sides sealed with a cathedral sealing die having a peaked roof. The folded edge 27 has the original strength of the laminate, and because of the major displacement of polyethylene from between the polyester films, there is no difficulty with leaking at the folded corner such as frequently occurs when single films are sealed.

For dry packed sutures, such as silk, cotton, linen, stainless steel, nylon, etc., which do not require a conditioning liquid, the suture may be placed in a glassine envelope, or inner plastic envelope which envelope is not sealed. Only the outer, strippable, ethylene oxide permeable, laminate envelope must be sealed.

Other modifications will be apparent to those skilled in the art which modifications coming within the scope of the appended claims are part of this invention.

I claim:

1. A suture package comprising a sterile surgical suture in a plastic laminate envelope having a liquid-tight, ethylene-oxide permeable, strippable seal, said envelope being formed from at least one laminate of a polyester film and a film selected from the group consisting of polyvinyl film and polyethylene film heat sealed to form a closed envelope with the faces of the film selected from said group in contact.

2. A suture package comprising a sterile surgical suture in a plastic laminate envelope having a liquid-tight, ethylene-oxide permeable, strippable seal, said envelope being formed from at least one laminate of a polyester film and a polyethylene film heat sealed to form a closed envelope with the polyethylene film faces in contact.

3. A suture package comprising a sterile surgical suture in a plastic laminate envelope having a liquid-tight, ethylene-oxide permeable, strippable seal, said envelope being formed from at least one laminate of a polyester film and a polyethylene film heat sealed to form a closed envelope with the polyethylene film faces in contact, which seal has substantially all of the polyethylene film of one laminate displaced from the seal area.

4. A suture package comprising a sterile surgical suture in a plastic laminate envelope having a liquid-tight, ethylene-oxide permeable, strippable seal, said envelope being formed from at least one laminate of a polyester film and a film selected from the group consisting of polyvinyl film and polyethylene film and heat sealed with the faces of the film selected from said group in contact, and having a pair of walls joined together by a peaked, strippable seal having a stress concentrating tip which seal is located inwardly of a pair of edges of the laminate to provide separate projecting edges, whereby said edges can be grasped and the envelope can be readily stripped open, starting at said tip.

5. A suture package comprising a sterile surgical suture in a plastic laminate envelope having a liquid-tight, ethylene-oxide permeable, strippable seal, said envelope being formed from at least one laminate of a polyester film and a polyethylene film and heat sealed with the polyethylene film faces in contact, which seal has substantially all of the polyethylene film of one laminate displaced from the seal area, and having a pair of walls joined together by a peaked, strippable seal having a stress concentrating tip which seal is located inwardly of a pair of edges of the laminate to provide separate projecting edges, whereby said edges can be grasped and the envelope can be readily stripped open, starting at said tip.

6. A suture package comprising a double plastic laminate envelope having a liquid-tight, ethylene-oxide permeable, strippable seal, said envelope being formed from at least one laminate of a polyetser film and a polyethylene film and heat sealed with the polyethylene film faces in contact, which seal has substantially all of the polyethylene film of one laminate displaced from the seal area, and having a pair of walls joined together by a peaked, strippable seal having a stress concentrating tip which seal is located inwardly of a pair of edges of the laminate to provide separate projecting edges, whereby said edges can be grasped and the envelope can be readily stripped open, starting at said tip; and an inner envelope heat sealed from said laminate, and a suture in said inner envelope.

7. The package of claim 6 in which the suture is dry packed in a dry inner envelope.

8. The package of claim 6 in which the inner envelope contains a conditioning liquid in which the suture is immersed.

9. A method of sealing laminates of a polyester film and a film selected from the group consisting of a polyvinyl film and a polyethylene film to form a liquid-tight, ethylene-oxide permeable, strippable seal which comprises placing two laminates of a polyester film and a film selected from said group in juxtaposition with the faces of the film selected from said group in contact, pressing the sealing areas towards each other, and heating the sealing area of one film until the film selected from said group of the heated film is substantially displaced from the area of the seal.

10. A method of sealing laminates of a polyester film and a polyethylene film to form a liquid-tight, ethylene-oxide permeable, strippable seal which comprises placing two laminates of a polyester film and a polyethylene film in juxtaposition with the polyethylene faces in contact, pressing the sealing areas towards each other, and heating the sealing area of one film until the polyethylene in the film of the heated film is substantially displaced from the area of the seal.

11. A package comprising a film formed from a laminate of a polyester film and a film selected from the group consisting of a polyvinyl film and a polyethylene film, having at least two film portions heat sealed to form a strippable seal with the faces of the film selected from said group in contact.

12. A package comprising a film formed from a laminate of a polyester film and a film selected from the group consisting of a polyvinyl film and a polyethylene film, having at least two film portions heat sealed to form a strippable seal with the faces of the film selected from said group in contact, in which a substantial portion of the film selected from said group is displaced from the area of the seal.

References Cited in the file of this patent

UNITED STATES PATENTS

| | | |
|---|---|---|
| 1,962,900 | Hirsch | June 12, 1934 |
| 2,333,587 | Salfisberg | Nov. 2, 1943 |
| 2,554,157 | Snyder | May 22, 1951 |
| 2,572,669 | Sarge et al. | Oct. 23, 1951 |
| 2,648,463 | Scherer | Aug. 11, 1953 |
| 2,650,183 | Langer | Aug. 25, 1953 |
| 2,742,390 | Beck | Apr. 17, 1956 |
| 2,824,642 | Stoltz | Feb. 25, 1958 |

FOREIGN PATENTS

| | | |
|---|---|---|
| 747,162 | Great Britain | Mar. 28, 1956 |
| 1,068,972 | France | Feb. 10, 1954 |